United States Patent
Kotowicz

(10) Patent No.: US 7,934,940 B2
(45) Date of Patent: May 3, 2011

(54) GROUND CONNECTION COMPRISING A VIBRATIONAL DAMPER FOR ELECTRONIC DEVICES

(75) Inventor: Edward Kotowicz, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 80 days.

(21) Appl. No.: 12/524,814

(22) PCT Filed: Jan. 29, 2008

(86) PCT No.: PCT/EP2008/051042
§ 371 (c)(1),
(2), (4) Date: Jul. 28, 2009

(87) PCT Pub. No.: WO2008/095830
PCT Pub. Date: Aug. 14, 2008

(65) Prior Publication Data
US 2010/0130037 A1    May 27, 2010

(30) Foreign Application Priority Data

Feb. 7, 2007  (DE) .................. 10 2007 006 177

(51) Int. Cl.
*H01R 13/648* (2006.01)
(52) U.S. Cl. ........................... 439/382; 439/2
(58) Field of Classification Search ............. 439/2, 382, 439/384
See application file for complete search history.

(56) References Cited

U.S. PATENT DOCUMENTS

| | | | |
|---|---|---|---|
| 4,222,029 A | | 9/1980 | Marquis, III et al. |
| 5,491,892 A | * | 2/1996 | Fritz et al. ................ 29/857 |
| 5,519,169 A | | 5/1996 | Garrett et al. |
| 6,019,614 A | | 2/2000 | Baur et al. |
| 6,188,019 B1 | | 2/2001 | Baur et al. |
| 6,863,566 B2 | * | 3/2005 | Scheuerer ................ 439/587 |
| 2010/0130037 A1 | * | 5/2010 | Kotowicz ................ 439/95 |

FOREIGN PATENT DOCUMENTS

| | | |
|---|---|---|
| DE | 9416775 U1 | 12/1994 |
| DE | 19742458 C1 | 11/1998 |
| DE | 19728291 A1 | 2/1999 |
| DE | 19951265 A1 | 5/2001 |
| DE | 10136361 A1 | 3/2003 |
| DE | 10205816 A1 | 8/2003 |
| DE | 102004041169 B3 | 6/2006 |
| EP | 1666759 A1 | 6/2006 |
| FR | 2803695 A1 | 7/2001 |
| JP | 5114793 A | 5/1993 |
| JP | 9027358 A | 1/1997 |
| JP | 2007012228 A | 1/2007 |

OTHER PUBLICATIONS

German Office Action dated Dec. 12, 2007.
International Search Report dated Jun. 23, 2008 and English version of Written Opinon.

* cited by examiner

*Primary Examiner* — James Harvey
(74) *Attorney, Agent, or Firm* — Laurence A. Greenberg; Werner H. Stemer

(57) ABSTRACT

A ground connection system for electronic components that are exposed to vibrations, wherein the system is mounted on a ground carrier, has a metal bushing and an elastic damping element. One or more electrically conductive spiral springs are fitted inside the metal bushing together with the elastic damping element. The springs form an electrically conductive connection between the electronic component and the ground carrier.

6 Claims, 2 Drawing Sheets

GROUND CONNECTION COMPRISING A VIBRATIONAL DAMPER FOR ELECTRONIC DEVICES

BACKGROUND OF THE INVENTION

1. Field of the Invention

The invention relates to a ground connection for electronic devices, in accordance with the preamble of claim 1, together with a method for making such a ground connection, in particular for gearbox or engine controllers in the automobile industry.

2. Prior Art

Modern mechatronics, that is to say in particular control electronics, which are installed directly where used, for example in a gearbox or engine, are subject to numerous environmentally-determined requirements. Apart from the long-term stability and security against failure of the controller, the raised operating temperatures and the mechanically demanding environment in the engine or gearbox, due to the constant vibrational stresses, are at the forefront. It is therefore imperative that the sensitive electronics are, as far as possible, protected from these influences. In addition to this, the strict requirements for electromagnetic screening play a role which is becoming ever greater because, in particular in the engine compartment, numerous electronic units and computer parts are brought together. Especially the design of the ground connection points for the electronic units represents a major challenge.

There are various known concepts for attaching the ground connection for electronic devices, for example in the engine controller, to the engine block. For example, there is often simply a pre-assembled conductor, such as for example a flexible copper lead fitted with an eye which can then be bolted onto the chassis or the engine block.

A conventional ground connection of this type exhibits several disadvantages. On the one hand, assembly faults can occur during mounting of the device or later during repair work. This may lead to an increase in the electrical contact resistance for the grounding connection, and to malfunctions of the device. On the other hand, this type of grounding connection calls for a relatively large number of individual parts which must be assembled one after the other, and thus to increased assembly costs.

DE 101 36 361 A1 describes a concept for making electrical contact to ground potential for a foil conductor. For this purpose, a ground bolt in the form of a thread on the housing and a special multi-part wing-screw which in a flat area has a holder for foil conductors are provided. At the same time, it also remains possible to affix and make contact with a conventional round conductor, using the screw.

DE 10 2004 041 169 B3 also describes an arrangement for making a grounding connection for an electrical circuit substrate. It proposes the provision of a plug connector between a circuit substrate and the grounding conductor, having a pin and a corresponding recess on the housing side, where the plug connector is embodied as an interference fit. The number and shape of the ground pins can here be designed flexibly.

The disadvantage of ground connections embodied in this way is that the concept can only be applied to the particular special grounding contact-making by means of a recess which must be provided on the housing side. Hence a prerequisite per se of these concepts is that it is necessary to form a special ground connection, either as a threaded bolt or as a recess on the grounding conductor. In addition, this calls for an increased accuracy of fit for the entire component arrangement relative to the special connection on the grounding conductor.

Over and above this, the known ground connections have little flexibility, and so are susceptible to failure over the course of the entire service life if the housing and components are subject to severe vibrations.

In this context, various oscillation dampers have been developed in the most recent past, for suspending a control electronics unit on housings.

Thus, an oscillation damper with a damping element made of elastic material is known from DE 199 51 265 A1, this being surrounded by a cup-shaped metal part. The interior space in the half-shell metal part is preferably closed off by a flexible part which can consist, in particular, of an electrically-conducting woven fabric. In this way, it ensures that the joint, between the two metal bolts which are fixed in opposing positions and which serve to affix the oscillation damper to the housing, is a good conductor. In this way, a grounding connection can be established via the electrically-conducting woven fabric.

A disadvantage of this development of the grounding connection is the fact that, due to the electrically conducting woven fabric, it is not sufficiently robust to provide problem-free contact-making over the entire service life of the engine or the gearbox, in an environment which is aggressive both mechanically and also chemically, and due to the temperatures. In addition, this design of oscillation damper is expensive and calls for the precise-fitting use of the expensive special woven fabric.

BRIEF SUMMARY OF THE INVENTION

Object of the Invention

The object of the invention is thus to provide a simplified concept for a grounding connection, for electronic components which are subject to vibrations, which permits simplified assembly and at the same time has a long service life.

This is achieved in accordance with the invention by a device conforming to claim 1.

In accordance with the invention, it is proposed to make available a ground connection, for electronic components which are subject to vibration, which has a metal sleeve and an elastic damping element, wherein the metal sleeve has inserted into it with the elastic damping element one or more electrically-conducting helical springs which can establish an electrically-conducting connection between the electronic component and the ground carrier.

By comparison with the ground connections known to date, the ground connection system of the present invention has the critical advantage that it does not require any demanding and expensive materials for its manufacture. Its construction from at least one helical spring and the ground carrier with the damping element permits in addition the cost-effective and flexible adaptation of the connection system for various requirements, for example for the sizing and spacing of the engine block and the control electronics. Over and above this, because of the materials used, the system in accordance with the invention offers a long service life and exceptional ability to withstand both mechanical and environmentally-determined influences. By using one or more integrated helical springs of an electrically-conducting material it is possible to produce both a cushioning of the vibrations and also a ground connection to the ground carrier. The arrangement in accordance with the invention thus offers not only increased reliability but also simplified assembly with no susceptibility to faults. In addition, the integration of the helical spring ensures a considerably simplified construction.

The form and size of the metal sleeve can be adjusted for the requirements of the electronic component and the ground carrier, as can the elastic damping element. The metal sleeve will preferably be made of an electrically-conducting metal sheet, for example sheet steel. In another embodiment of the invention, the metal sleeve can have openings in the region of the helical springs of such a nature that the helical springs can make contact with the ground carrier through the openings.

For the purpose of adherence to the regulations on electromagnetic screening of the individual electronic items, the elastic damping element will preferably be made of an insulating material. It is particularly preferred if the damping element consists of rubber or silicones.

A particularly preferred use for a ground connection in accordance with the invention, for an electronic component which is subject to vibrations, is as a component of a connection for control electronics in the automobile industry, in particular for gearboxes and/or engines.

The invention is explained below by way of example by reference to two variant embodiments, in conjunction with the drawings.

Shown in these are:

DESCRIPTION OF THE INVENTION

Figure 1:
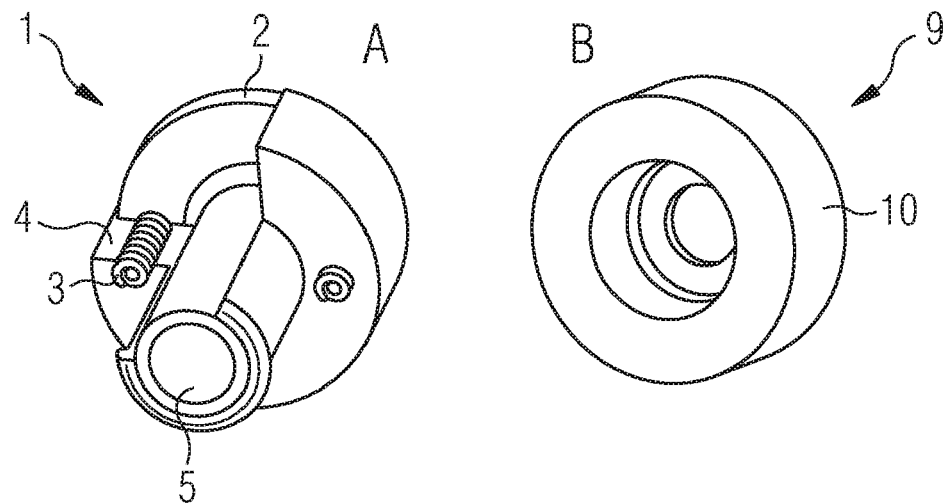
FIG. 1 a perspective plan view of a ground connection system in accordance with the invention, FIG. 2 a cross-sectional view of an assembled ground connection system as in FIG. 1, FIG. 3 a perspective plan view of another embodiment of a ground connection system in accordance with the invention, and FIG. 4 a cross-sectional view of an assembled ground connection system as in FIG. 3.

FIG. 1 shows a perspective plan view of a ground connection system 1 in accordance with the invention. The partial assembly A of the ground connection system 1 has a metal sleeve 2 and an elastic damping element 4 in which are inserted two electrically-conducting helical springs 3. The metal sleeve 2 can be ring-shaped in form, whereby in the form of embodiment shown a tube-shaped extension is formed on the inner circumference of the metal ring. It is advantageous that this produces a through hole 5, through which a fixing element 7, for example a machine screw, can be passed. The damping element 4 with the inserted helical springs 3 can be seated on the metal sleeve 2 as the ground carrier. The damping element 4 will preferably be made of an insulating material, for example rubber. It is expedient if the damping element 4 is also ring-shaped in form and its dimensions are matched to the metal sleeve 2 and the relevant requirements. It is advantageous if the damping element 4 has a close-fitting seating on the metal sleeve 2, thus ensuring that the seating of the damping element 4 is secure, and with it also the contact-making by the helical spring 3. In the assembled state, the tube-shaped extension of the metal sleeve 2 can project out beyond the damping element 4. That part of the metal sleeve 2 which then stands out can, if necessary, also be covered by an insulating material. This insulating covering can be made in one piece with the damping element 4. In addition to the part A, a part B can optionally be provided as a counterpart 9. This can also be ring-shaped in form, and can have a close-fitting seating on the tube-shaped projection of the metal sleeve 2. The counterpart 9 can be used for attachment to a component which is subject to vibration, for example as the backing washer for a bolt and/or to match the sizes, for example to compensate for a height difference or to space components in the assembled state. This counterpart 9 can also incorporate a damping element 10, so that in addition it contributes to the damping of vibrations which occur.

Figure 2:
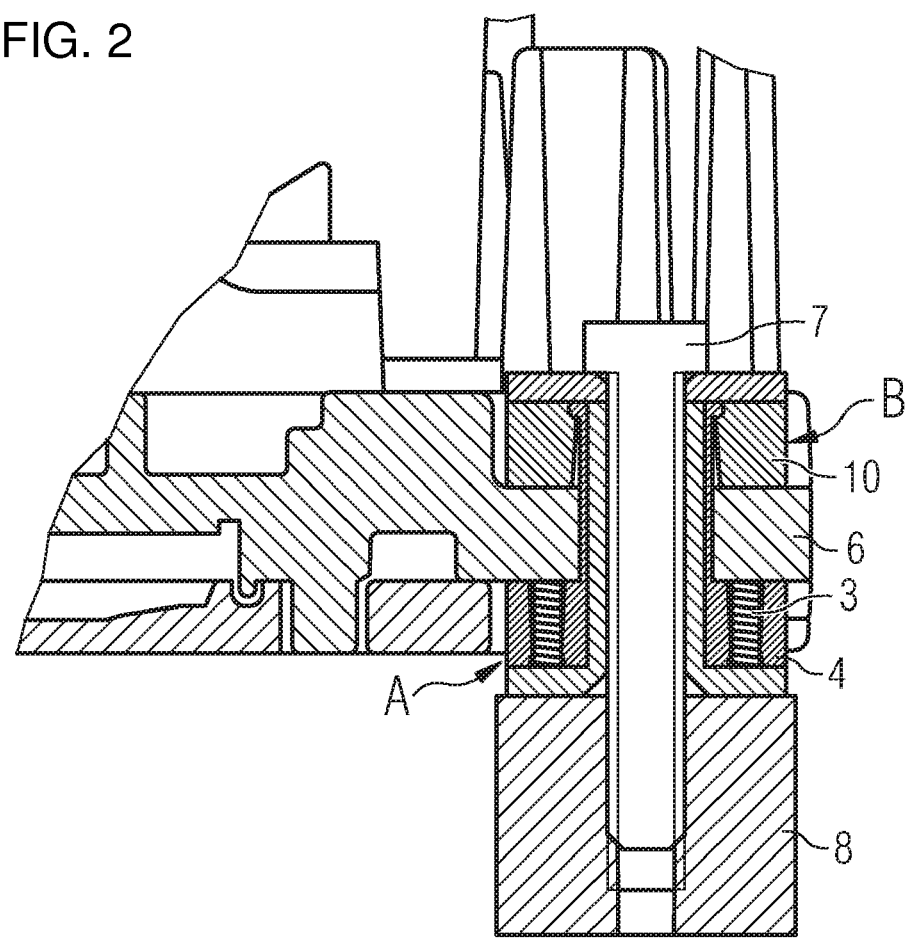

FIG. 2 shows a cross-sectional view of an assembled ground connection system as in FIG. 1, for connecting an electronic component 6, for example an engine control system, to a ground carrier 8. The ground carrier 8 could be, for example, an engine block. Part A of the ground connection system can be seated on the ground carrier 8. The helical springs 3, which are inserted in the damping element 4, make contact with the electronic component 6 arranged above them. In an advantageous manner, the helical springs 3 can solve the problem of contacting and in addition also react flexibly to vibrations which occur. This substantially increases the long-term stability of the ground connection. The electronic component 6 can here be a close fit around the tube-shaped projection of the metal sleeve 2. This has the advantage that any sideways relative movement can be suppressed when vibrations occur. Part B of the ground connecting system 1 can be seated on top of the electronic component 6. By means of a fixing facility 7 through the through-hole 5, for example a machine screw, the entire combination of ground connection system 1 and electronic component 6 can be securely affixed to the ground carrier 8.

Figure 3:
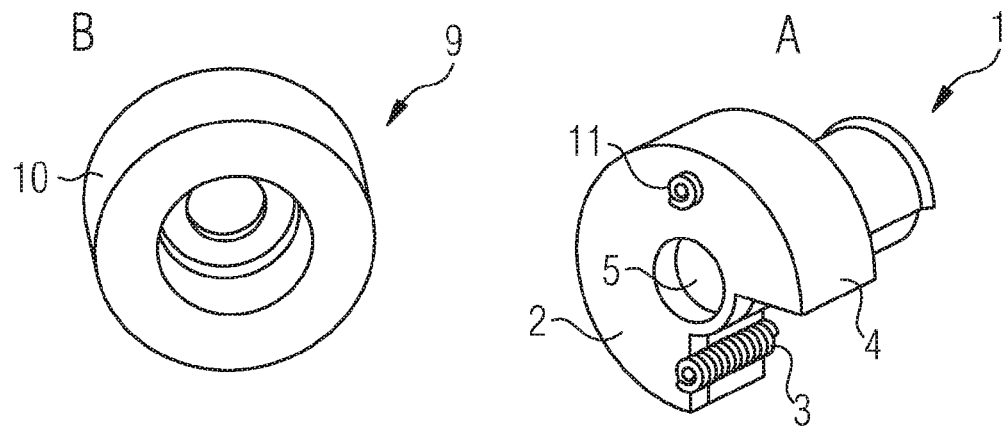

FIG. 3 shows a perspective view of another form of embodiment of the inventive ground connection system 1. In this embodiment, the ground connection system 1 has, as the part A, a metal sleeve 2 and an elastic damping element 4 with two electrically-conducting helical springs 3 inserted therein, where the helical springs 3 can pass through and stand proud of the openings 11 in the face of the metal sleeve 2. In this embodiment, the helical spring 3 can make direct contact on a ground carrier 8. The remaining construction corresponds to that shown for the ground connection system 1 in FIG. 1.

Figure 4:
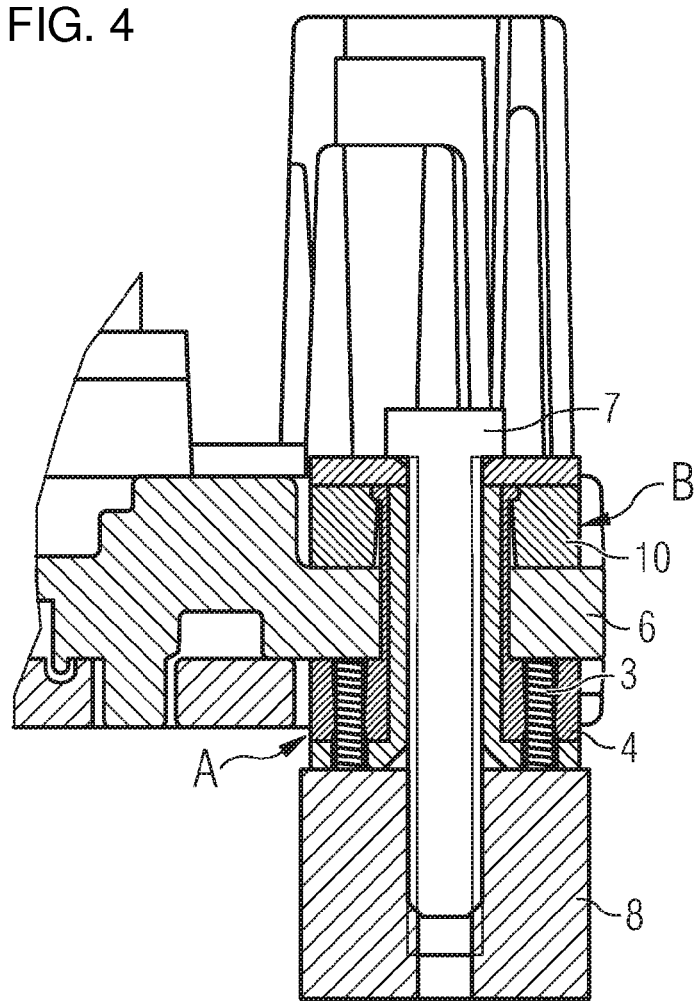

FIG. 4 shows a cross-sectional view of an assembled ground connection system 1 as in FIG. 3, for connecting an electronic component 6, for example an engine control system, to a ground carrier 8. The ground carrier 8 could be, for example, an engine block. Part A of the ground connection system 1 can be seated on the ground carrier 8. The helical springs 3, which are inserted into the damping element 4 and on its lower side also pass through the openings 11 in the face of the metal sleeve 2, can advantageously make a direct contact between the electronic component 6 arranged above it and the ground carrier 8. The remaining construction corresponds to that shown for the assembled ground connection system 1 in FIG. 2.

In summary, the inventive ground connection system provides for the first time a way of making a ground connection to a ground carrier, for electronic components which are subject to vibrations, in which a ground connection to the ground carrier can be established by means of one or more integral helical springs made of an electrically-conducting material. The inventive arrangement offers at the same time increased reliability and also simplified assembly with no susceptibility to faults. In addition, the integration of the helical springs ensures a substantially simplified construction.

The invention claimed is:

1. A ground connection system for connecting an electronic component that is subject to vibrations to a ground carrier, the ground connection system comprising:
   a metal sleeve and an elastic damping element;
   one or more electrically conductive helical springs incorporated with said elastic damping element within said metal sleeve, said helical springs forming an electrically conductive connection between the electronic component and the ground carrier.

2. The ground connection system according to claim 1, wherein said elastic damping element is formed of insulating material.

3. The ground connection system according to claim 2, wherein said elastic damping element is formed of rubber.

4. The ground connection system according to claim 1, configured for affixing to the ground carrier by way of a machine screw.

5. In a motor vehicle, a ground connection system for an electronic component comprising:
   a metal sleeve and an elastic damping element;
   one or more electrically conductive helical springs incorporated with said elastic damping element within said metal sleeve, said helical springs forming an electrically conductive connection between the electronic component and the ground carrier;
   the electronic component is subject to vibrations, formed as an integral component part of a connection for control electronics in the motor vehicle.

6. In a motor vehicle, a ground connection system for an electronic component comprising:
   a metal sleeve and an elastic damping element;
   one or more electrically conductive helical springs incorporated with said elastic damping element within said metal sleeve, said helical springs forming an electrically conductive connection between the electronic component and the ground carrier;
   the electronic component is subject to vibrations, formed as an integral component part of a connection for gearbox control electronics or engine control electronics in the motor vehicle.

* * * * *